Dec. 15, 1931.   J. M. ODEN   1,836,489
FLEXIBLE GASOLINE PROOF HOSE
Filed March 20, 1929
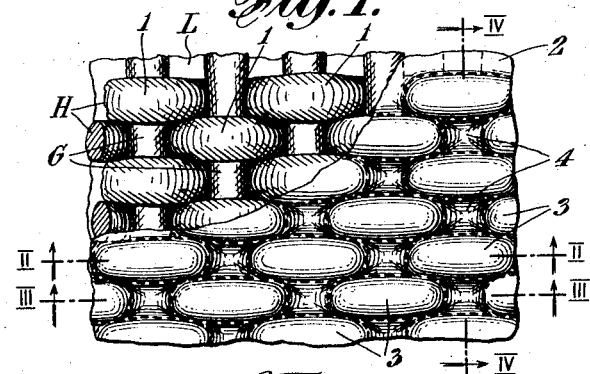
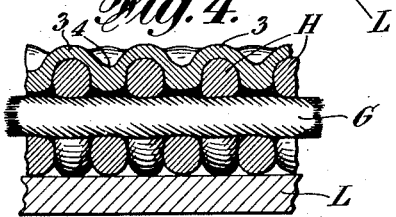
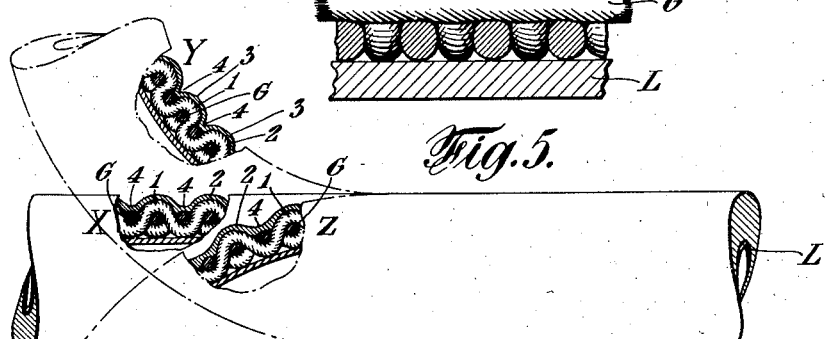
INVENTOR
John M. Oden.
BY
ATTORNEY Patented Dec. 15, 1931

1,836,489

UNITED STATES PATENT OFFICE

JOHN M. ODEN, OF BROOKLYN, NEW YORK

FLEXIBLE GASOLINE PROOF HOSE

Application filed March 20, 1929. Serial No. 348,381.

This invention relates to a flexible gasoline proof hose, and an object is to provide a hose having a gasoline proof sheath which shall be of such form and character as to maintain its gasoline proof quality unimpaired even in the presence of the continual flexing to which the hose may be subjected in daily use.

A further object is to provide a flexible hose having a gasoline proof sheath applied thereto, so designed that it will be capable, without appreciable stretching of its component parts, of any elongation or reduction in length at different localities as may be required within the limits of flexibility of the hose.

A further and more detailed object is to form the sheath as a multitude of hemispherical or dome-like sections all integrally and flexibly connected together and independently flexible so that said sections will simply be increased or reduced in radii incident to flexing of the hose.

A more detailed object is to provide a flexible hose including a coarse canvas tubular member and a gasoline proof jacket covering said member and fitting thereto, the canvas member having its warp threads extending longitudinally of the hose and so entwined with its woof threads as to provide a surface made up of a multitude of hemispherical dome-like protuberances spaced apart both longitudinally and transversely of the hose, the radii of the protuberances being subject to constant change incident to flexing of the hose, and the jacket being formed of a flexible gasoline proof material, such for instance as a suitable pyroxylin compound, and being of a general tubular form fitting snugly to the protuberances of the canvas, said jacket being of approximately uniform thickness throughout so that it partakes of the hemispherical or dome-like contour of the protuberances, to the end that elongation of the jacket, as on the outside of the curve when the hose is flexed, or reduction in length of the jacket, as on the inside curve of the flexed hose, will be accommodated by a simple flexing movement of component parts of the jacket and without any appreciable stretching of said parts.

A further detailed object is to make the canvas member of the hose of sufficiently coarse texture that the outwardly extending protuberances defined by the warp threads thereof shall be of such size that a flexible gasoline proof sheath of appropriate thickness applied thereover shall be made by its fit to said protuberances, to consist of hemispherical dome-like sections flexible with said warp threads, and without appreciable stretching, within the limits of flexibility of the hose.

A further object is to provide a flexible gasoline proof sheath as indicated which may be either at the outer surface of the hose, for preventing penetration of gasoline inwardly from without the house, or as an inner member of the hose, for preventing penetration of gasoline outwardly from within the hose.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which is to be taken as a part of this specification, and in which I have shown merely a preferred form of embodiment of the invention:—

Fig. 1 is a plan view of a section of hose having a gasoline proof sheath over a portion thereof in accordance with this invention.

Fig. 2 is a longitudinal sectional view taken upon the plane of line II—II of Fig. 1.

Fig. 3 is a similar view taken upon the plane of line III—III of Fig. 1.

Fig. 4 is a transverse sectional view taken upon the plane of line IV—IV of Fig. 1, and Fig. 5 is a side elevational view of a piece of hose constructed in accordance with this invention, and illustrating diagrammatically the condition of a section thereof in normal and in different flexed conditions, and Fig. 6 illustrates, in a reduced scale, a section of hose made up with a rubber body located between inner and outer gasoline proof sheaths constructed in accordance with this invention.

Referring to the drawings for describing in detail the structure therein illustrated, the reference character L indicates what may be referred to as the interior or body portion of the hose. This may be of any construction and of any material or materials according to the purpose for which the hose is intended.

About the outer surface of this body there is shown a canvas cover having woof thread or threads G and warp threads H, such as may be applied by an ordinary circular loom in the usual manner.

The threads G and H are sufficiently heavy so that the outwardly extending loops of the warp threads, where they wrap around the outer surface of the woof threads, each define a semi-circular protuberance. Since the warp threads alternately extend above and below a given woof thread, and since a given warp thread extends alternately above and below succeeding woof threads, these protuberances are definitely spaced apart both longitudinally and transversely of the hose.

In all instances, both longitudinally and transversely of the hose, the spaces between these little domes or protuberances, indicated 1 on the drawings, extend down to the woof threads so that said domes or protuberances have generally a hemispherical outer surface contour and are clearly defined with respect to each other.

When a length of hose having this canvas thereon is flexed longitudinally the woof threads will move toward each other or apart and the radii of all of the domes or protuberances within the flexed area considered lengthwise of the hose will be either enlarged or reduced, according to whether they lie on the outside or the inside of the curve defined by the hose. The radii, considered transversely of the hose, are also changed in some instances, particularly where the longitudinal flexing of the hose results in a change of its general circular contour. These changes in radii are altered and reversed continually with each change of degree or direction of flexing of the hose.

The coarser the canvas the more pronounced will be this variation in radii.

About the outer surface of this canvas cover there is a sheath or jacket 2 which preferably surrounds or envelopes the hose for its entire length. This sheath is formed of a suitable flexible gasoline proof material, such as a pyroxylin compound, but owing to its peculiar shape, and its relation to the canvas cover, it need not be possessed of any appreciable ability to stretch.

Experience has taught that it is extremely difficult, if not impossible, to provide a flexible jacket or sheath which will maintain its gasoline proof quality when subjected to any appreciable amount of, or repeated, stretching in use. Hence, since the flexing of a hose in use imposes constant alternate elongation and restriction of first one side portion and then another of the hose, it has been necessary, in order to maintain the gasoline proof quality of the enveloping jacket or sheath, to provide for this elongation and restriction without accompanying stretching action of the material of the sheath.

By employing a canvas cover as above described, having its little domes or protuberances sufficiently large, and each arranged independently to change the radius of its outer surface whenever the hose is flexed, and by arranging the flexible sheath as a relatively thin shell fitting thereto and partaking of the generally hemispherical contour of the multitudinous domes and protuberances as shown, a sheath is produced which is made up throughout its extent of a multitude of hemispherical shell like sections, as 3, flexibly integrally connected together, each of such ample radius as to enable all of them to flex readily for increasing or reducing their radii, and for thus providing, without appreciable stretching of any part thereof, such elongation or restriction of the sheath as may be imposed by any flexing movement of which the hose is capable. The hemispherical shell like sections of the sheath simply flatten out or hump up, as the case may be, always maintaining their intimate fit to the underlying protuberances of the canvas.

In Fig. 5 of the drawings a portion of the hose is shown in section in three different conditions. At X a portion of the hose is shown in normal conditions as when the hose is straight. At Y the same portion of the hose is shown as on the inside of the curve when the hose is flexed, and at Z the same portion is shown on the outside of the curve when the hose is flexed. By comparison of these three sectional illustrations, and particularly of the views Y and Z, it is noted that back and forth flexing of the hose not only alters the radius of the protuberances 1 but also changes the distance between the protuberances, so that those portions as 4—4 of the sheath 2 intermediate the protuberances, and which convex oppositely to the portions overlying the protuberances, also change their radius. When the protuberances move apart there is a tendency for the portions 4—4 to stretch, and it is consequently a particular feature of the present invention to make the sheath of such thickness and character that it will simply flex to a different radius, rather than stretch or break, to bridge the increased space. In fact the tenacity and flexibility of the material of the sheath is such that it will insure flexing both of the portions overlying the protuberances and of the portions intermediate the protuberances, the one drawing upon and flexing the other as may be necessitated by stretching of the hose, and without fracture at any point.

The sheath 2, being gasoline proof, may be utilized to prevent penetration of gasoline inwardly from without the hose or outwardly from within the hose, according to the requirements of any particular use of the hose. Obviously if a rubber filler or the like, as for instance the body L herein referred to, is to be protected from the detrimental effects of gasoline the sheath would of course be placed between the rubber and gasoline. In the instance illustrated the gasoline proof sheath is exteriorly of the hose serving primarily to prevent penetration of gasoline from without the hose inwardly to the body L. It will serve equally well however to prevent penetration of gasoline outwardly from within the hose and this may be particularly advantageous if the hose be made to include a rubber cover exteriorly of the sheath as may sometimes be desirable. In fact if a rubber cover be applied exteriorly of the sheath an outside canvas and sheath may be applied over the outer surface of the rubber thus locating the rubber in a protected position between the two sheaths, as at 5, in the general manner as shown in Fig. 6 and more fully illustrated in my co-pending application, Serial No. 160,362.

As many changes could be made in this construction without departing from the scope of the invention as defined in the following claims, it is intended that all matter contained in the above description, or shown in the accompanying drawings, shall be interpreted as illustrative only and not in a limiting sense.

Having thus described my invention, what I claim as new and desire to secure by Letters Patent is:—

1. A flexible gasoline proof hose comprising a flexible body part, and a flexible sheath therefor, said sheath consisting of a layer of flexible gasoline proof material made up throughout of a multitude of dome-like sections of general hemispherical cross-section all integrally connected together and of a character to permit, upon flexing of said sections, increase and reduction in length of any portion of the sheath as may be required within the maximum flexing limits of the body part.

2. A flexible gasoline proof hose comprising a flexible body part, a flexible canvas cover enveloping said body part, and a flexible sheath enveloping said canvas cover, said canvas cover consisting of warp threads extending longitudinally of the hose and entwined with circumferentially extending woof threads so that each warp thread provides a series of laterally extending arcuate protuberances longitudinally of the hose, said warp threads collectively providing an outer surface for the hose comprising a multitude of said protuberances in proximity to each other throughout said surface, said sheath consisting of a layer of flexible gasoline proof material applied over said protuberances and intimately associated therewith, said sheath being of such flexibility and of such thickness with respect to the radii of the protuberances that said sheath provides a multitude of dome-like sections of general hemispherical cross section all integrally connected together and of a character to permit, upon flexing of said sections, increase and reduction in length of any portion of the sheath as may be required within the maximum flexing limits of the body part.

3. A gasoline proof hose comprising an inner flexible sheath, an outer flexible sheath, and a rubber filler intermediate said sheaths, said sheaths each consisting of a layer of flexible gasoline proof material made up throughout of a multitude of dome-like sections of general hemispherical cross section all integrally connected together and of a character to permit, upon flexing of said sections, increase and reduction in length of any portions of said sheaths as may be required within the maximum flexing limits of the hose.

In testimony whereof I affix my signature.

JOHN M. ODEN.